Patented May 15, 1934

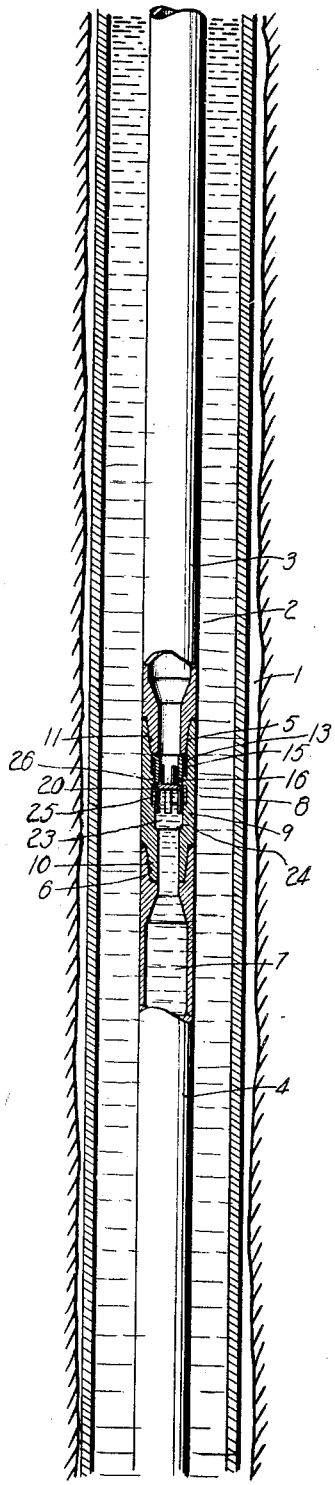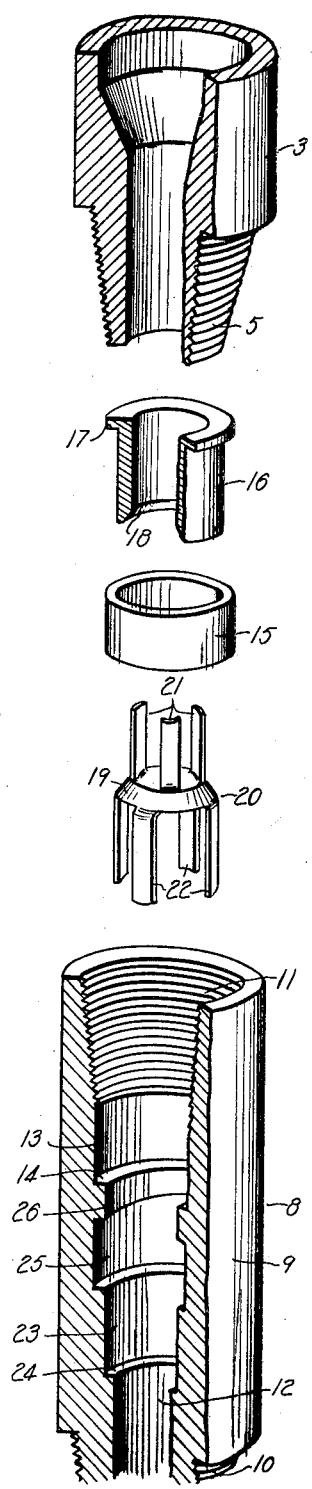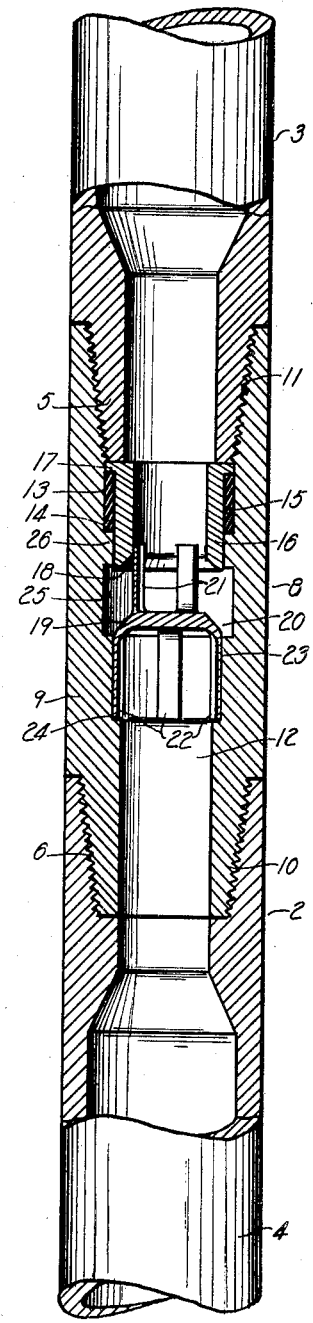

1,959,043

UNITED STATES PATENT OFFICE 1,959,043

FLOAT VALVE

Horris W. Todd, Seminole, Okla., assignor of one-half to A. P. Anderson, Seminole, Okla.

Application July 12, 1930, Serial No. 467,479

2 Claims. (Cl. 137—69)

My invention relates to valves and more particularly to float valves employed in drill pipe of rotary oil well drilling equipment for partially floating the pipe on its descent into a well hole to relieve the operating cable and derrick of a large percentage of its load incurred by the weight of the pipe.

The principal objects of my invention are to provide a valve that is positive in operation, that can be manufactured at low cost, and that embodies means to prevent erosion of the threads, used for connecting the valve housing to adjacent pipe sections, which frequently occurs in valves now available, due to the passage of drilling fluid under high pressure through the housing.

A further object of the invention is to provide a valve of this character that may be interposed in a drill pipe string without modification of the standard pin and box ends of the pipe sections.

In accomplishing these and other objects of my invention I have provided improved details of structure the preferred form of which is illustrated in the accompanying drawing, wherein:

Fig. 1 is a central vertical section of a portion of a well hole, a drill pipe being shown therein in elevation, and a float valve joining adjacent ends of the pipe being shown in central longitudinal section with the valve in closed position.

Fig. 2 is a disassembled view of the valve parts and a drill pipe end shown in perspective with portions thereof broken away to better illustrate formation of the parts.

Fig. 3 is a central longitudinal section of the valve in open position and of pipe sections connected therewith.

Referring more in detail to the drawing:

1 designates a well hole being drilled with a rotary rig including drill pipe 2 comprising tubular sections 3 and 4. The opposite ends of the pipe sections are provided with the usual pin ends 5 and box ends 6 for joining the sections to form a continuous string.

In order to partially float the pipe on the liquid 7 in the well while being lowered and thereby relieve the cable of a portion of its load a float valve 8 is interposed between adjoining sections of pipe; one or more valves being provided in the line as required.

The valve includes a tubular body 9 having a pin end 10 and a box end 11 on its lower and upper ends respectively for threadedly engaging the adjoining pipe sections. The upper end of the channel 12 extending through the valve body is counter-bored to produce a socket 13 forming a lateral shoulder 14 for receiving a packer or sealing ring 15 preferably formed of rubber.

Seated on the ring is a sleeve 16 concentrically mounted in the socket 13, and having an upper outwardly extending flange 17 adapted to engage the upper edge of the sealing ring, and in turn engaged by the pin end of the pipe section 3 to urge the sleeve downwardly into the valve body when the housing is connected to said section and compress the packer, thereby forming a fluid-tight joint.

Provided in the lower end of the sleeve is a tapered seat 18 for cooperating with the complementary tapered seat 19 of a valve 20 having a plurality of fingers 21 formed integrally with its upper face to slidably engage the inner surface of the sleeve.

Depending downwardly from the valve and preferably formed integrally therewith are a plurality of fingers 22 for engaging a slightly enlarged portion 23 of the channel 12.

When in its lower-most position, the lower fingers rest on a lower lateral shoulder 24 formed by the enlarged portion 23 and in order to permit free passage of drilling fluid around the valve when in open position a further enlarged by-pass chamber 25 is provided in the valve body immediately below the sleeve 16, this structure thereby forming an inwardly directed annular flange 26 between the enlarged chamber and the packing ring which serves as a guide for the sleeve 16.

Assuming a float valve to be constructed as described the procedure of assembling the valve on a string of drill pipe, and the operation of the valve when in the line, would be as follows:

To interpose the valve in a pipe string it is merely necessary to disconnect adjacent sections of the pipe at a predetermined point in relation to the liquid in the well hole and to thread the pin end of the valve housing into the lower pipe section. The valve is then inserted in the housing and the ring and sleeve are positioned in the upper enlarged opening of the housing.

The pin end of the upper pipe section is next threaded into the upper box end of the valve housing until the sleeve has been urged into firm sealing engagement with the valve body.

Upon lowering the drill pipe into the well hole the valve remains in open position until it reaches the liquid level in the well. Further descent of the pipe closes the valve and a large portion of the weight of the drill pipe string is carried by the liquid standing in the well hole.

When the drill bit, connected to the lowered end of the drill pipe, has reached the bottom of the well and drilling fluid is forced through the drill pipe to soften the formation encountered by the bit, the valve is moved to open position by the drilling fluid under pressure, and due to the enlarged chamber surrounding the valve the fluid is free to pass downwardly through the drill pipe.

It will be apparent that with a structure such as I have disclosed, no change of the pipe sections is necessary to adapt the valve housing for interposition in the pipe string, and due to the elimination of threads for holding the valve members in the valve body the danger of erosion of the threads by sand or the like flowing through the line is eliminated, and the expense of re-threading such portions as is frequently necessary in valves provided for a similar purpose, is obviated.

Due to the simple construction of the valve parts the initial cost of installation of the valve, and of replacement of valve parts is very low.

What I claim and desire to secure by Letters Patent is:

1. In a device of the character described, a housing having a longitudinal channel enlarged throughout a portion of its length to form a lateral shoulder, a further enlarged socket in the upper end of the channel forming a second lateral shoulder above said first-named shoulder, a sealing ring in said socket and resting on the second lateral shoulder, a sleeve in the channel having an outwardly directed flange on its upper end engaging the sealing ring, said sleeve having a valve seat on its lower end, and a valve adapted to engage said seat having upper spaced fingers adapted to slide in the sleeve and lower spaced fingers adapted to slide in the channel, said lower fingers resting on the first-named lateral shoulder when the valve is open.

2. In a device of the character described, a housing having a longitudinal channel enlarged throughout the upper portion of its length to form a lateral shoulder, a valve adapted to be inserted in said enlarged portion having lower guide members slidably engaging the enlarged channel, and resting on said shoulder when the valve is open, a counter-bored socket in the upper end of said enlarged portion of the channel, a sealing ring seated in said socket, a sleeve slidable in the enlarged channel having an outwardly directed flange adapted to bear on the upper end of the sealing ring and a valve seat on its lower end for cooperating with said valve, guide means projecting upwardly from said valve and slidably engaging the sleeve, and an annular chamber in said enlarged channel immediately below the valve seat.

HORRIS W. TODD.